US012001948B1

United States Patent
Teig et al.

(10) Patent No.: US 12,001,948 B1
(45) Date of Patent: Jun. 4, 2024

(54) MACHINE TRAINED NETWORK USING NOVEL CODING TECHNIQUES

(71) Applicant: Perceive Corporation, San Jose, CA (US)

(72) Inventors: Steven L. Teig, Menlo Park, CA (US); Andrew C. Mihal, San Jose, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 1151 days.

(21) Appl. No.: 15/836,676

(22) Filed: Dec. 8, 2017

Related U.S. Application Data

(60) Provisional application No. 62/431,478, filed on Dec. 8, 2016.

(51) Int. Cl.
*G06N 3/08* (2023.01)
*G06N 3/047* (2023.01)
(Continued)

(52) U.S. Cl.
CPC .......... *G06N 3/08* (2013.01); *G06N 7/01* (2023.01); *G06N 20/00* (2019.01); *G06N 3/047* (2023.01)

(58) Field of Classification Search
CPC ........ G06N 3/049; G06N 3/0454; G06N 3/02; G06N 3/082; G06N 3/08; G06N 7/005;
(Continued)

(56) References Cited

U.S. PATENT DOCUMENTS 5,255,347 A 10/1993 Matsuba et al.
8,036,877 B2 * 10/2011 Treadgold .............. G06F 40/30
704/9
(Continued)

FOREIGN PATENT DOCUMENTS

WO 2016118402 A1 7/2016

OTHER PUBLICATIONS

Cha, Young-Jin, and Choi, Wooram and Buyukozturk, Oral, Deep Learning-Based Crack Damage Detection Using Convolutional Neural Networks, 2017, Computer-Aided Civil and Infrastructure Engineering, 32,May 2017, p. 361-374 (Year: 2017).*
(Continued)

*Primary Examiner* — Ann J Lo
*Assistant Examiner* — Leonard A Sieger
(74) *Attorney, Agent, or Firm* — ADELI LLP

(57) ABSTRACT

Some embodiments of the invention provide a machine-trained method that selects an output from a plurality of outputs by processing an input. The method uses layers of machine-trained processing nodes to process the input to produce a multi-dimensional codeword. The method generates a set of affinity scores with each affinity score identifying the proximity of the produced codeword to a codeword in a first set of previously defined codewords. The method compares the set of affinity scores generated for the produced codeword with sets of affinity scores previously generated for the first-set codewords that express the proximity of the first-set codewords to a second set of codewords. The method identifies the first-set codeword that has the affinity score set that best matches the affinity score set generated for the produced codeword. The method selects the associated output of the identified first-set codeword as the output of the network.

21 Claims, 7 Drawing Sheets

(51) Int. Cl.
*G06N 7/01* (2023.01)
*G06N 20/00* (2019.01)

(58) Field of Classification Search
CPC ........ G06N 3/0472; G06N 20/00; G06N 7/01; G06N 3/047
See application file for complete search history.

(56) References Cited

U.S. PATENT DOCUMENTS

| | | | |
|---|---|---|---|
| 9,286,524 B1 | 3/2016 | Mei et al. | |
| 10,282,168 B2* | 5/2019 | Fazl Ersi | G06F 16/2465 |
| 2010/0310157 A1* | 12/2010 | Kim | G06K 9/6232 |
| | | | 382/190 |
| 2014/0079297 A1 | 3/2014 | Tadayon et al. | |
| 2015/0161995 A1 | 6/2015 | Sainath et al. | |
| 2016/0063357 A1* | 3/2016 | Gao | G06N 7/00 |
| | | | 382/159 |
| 2017/0161640 A1 | 6/2017 | Shamir | |

OTHER PUBLICATIONS

"Sze et al., Efficient Processing of Deep Neural Networks: A Tutorial and Survey, 2017, Proceedings of the IEEE 105.12, pp. 2295-2329" (Year: 2017).*

"Mandelbaum et al., Distance-based confidence score for neural network classifiers, Sep. 28, 2017, ArXiv preprint arXiv: 1709.09844" (Year: 2016).*

Jansen et. al., "The neural-SIFT feature descriptor for visual vocabulary object recognition", 2015, International Joint Conference on Neural Networks, vol. 2015, pp. 1-8 (Year: 2015).*

Xia et. al., "Learning similarity with cosine similarity ensemble", 2015, Information Sciences, vol. 307, pp. 39-52 (Year: 2015).*

Natsev et al., "A study of image retrieval by anchoring", 2002, Proceedings. IEEE International Conference on Multimedia and Expo, vol. 2 (2002), pp. 421-424 (Year: 2002).*

Van Gemert et al., "Kernel Codebooks for Scene Categorization", 2008, Computer Vision—ECCV 2008, pp. 696-709 (Year: 2008).*

Song et al., "Local Coding Based Matching Kernel Method for Image Classification", 2014, PLoS One, vol. 9(8), pp. 1-13 (Year: 2014).*

Wang et al., "Linear Distance Coding for Image Classification", 2013, IEEE Transactions on Image Processing, vol. 22 no, pp. 537-548 (Year: 2013).*

Avila, "Extended Bag-of-Words Formalism for Image Classification", 2013, Université Pierre et Marie Curie (Year: 2013).*

Natsev et al., "New anchor selection methods for image retrieval", 2003, Proceedings of SPIE: Storage and Retrieval for Media Databases, vol. 2003, pp. 474-481 (Year: 2003).*

Duda, Jarek, "Asymmetric Numeral Systems: Entropy Coding Combining Speed of Huffman Coding with Compression Rate of Arithmetic Coding," Jan. 6, 2014, 24 pages, arXiv:1311.2540v2, Computer Research Repository (CoRR)—Cornell University, Ithaca, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Jain, Anil K., et al., "Artificial Neural Networks: A Tutorial," Computer, Mar. 1996, 14 pages, vol. 29, Issue 3, IEEE.

Non-published commonly owned U.S. Appl. No. 15/836,694, filed Dec. 8, 2017, 44 pages, Perceive Corporation.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

* cited by examiner

MACHINE TRAINED NETWORK USING NOVEL CODING TECHNIQUES

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM). As is also the case for most other types of models, DNNs are sufficiently expressive in that they can easily overfit data, i.e., model some of the uninformative noise in the input data in addition to the informative signal.

SUMMARY

Some embodiments of the invention provide a machine-trained method that produces an output from a set of outputs by processing an input. The method uses several layers of machine-trained processing nodes to process the input to produce a multi-dimensional codeword. For the produced codeword, the method generates a set of codeword affinity scores with each affinity score in the set identifying the proximity of the produced codeword to a different codeword in a set of previously defined codewords in a multi-dimensional codeword space.

In some embodiments, this space includes a first set of codewords that has at least one codeword for each output in the set of outputs, and a second set of codewords that includes several codewords that are defined to differentiate the first set of codewords from each other. The second set of codewords in some embodiments includes some but not all of the first set of codewords. In other embodiments, the second set of codewords do not include any of the first set of codewords. In some embodiments, the codeword affinity scores that the method generates identify the proximity of the produced codeword to a different codeword in the second set of codewords.

The method compares the set of affinity scores generated for the produced codeword with sets of affinity scores previously generated for the first set codewords that express the proximity of the first-set codewords to the second-set codewords. Based on this comparison, the method identifies the first-set codeword that has the affinity score set that best matches the affinity score set generated for the produced codeword. The method selects the associated output of the identified first-set codeword as the output of the network for the input. The outputs in some embodiments are categories with which the machine-trained method has to associate each of several inputs.

As mentioned above, the second set of codewords in some embodiments includes codewords that are defined in the multi-dimensional codeword space in order to differentiate the different codewords in the first set of codewords for the different outputs of the network. Also, in some embodiments, the second set of codewords has a different number of codewords than the first set of codewords. For instance, the second set of codewords in some embodiments has more codewords than the first set of codewords. In some embodiments, the second set of codewords are defined in the multi-dimensional codeword space in order to define the boundaries between the first set of codewords that are generated for the outputs.

To compute the affinity score set for the produced codeword, the method in some embodiments computes an exponential decay score that expresses the distance between the produced codeword and one of the codewords in the second codeword set. For each codeword in the second codeword set, the exponential decay score in some embodiments is proportional to a base value (e.g., Euler's constant e) raised to the negative of the distance between the produced codeword and the codewords with second codeword set. In some of these embodiments, each exponential decay score is a normalized score that is computed by dividing the exponential decay score by the sum of all exponential decay scores computed for the produced codeword and each codeword in the second codeword set.

To compare the affinity score set generated for the produced codeword with each affinity score set previously generated for a first set codeword of one of the outputs, the method treats each affinity score set as defining a point in another multi-dimensional space, and then computes a proximity score (e.g., a distance score) between these two points. This proximity score expresses the proximity between the previously defined affinity score set for the codeword of one of the outputs and the affinity score set generated for the produced codeword.

In some embodiments, each proximity score is an exponential decay score that is proportional to a base value (e.g., Euler's constant e) raised to the negative of the distance between the two affinity score sets for which the proximity score set is computed. In some of these embodiments, each proximity score is a normalized score that is computed by dividing its exponential decay score by the sum of all exponential decay scores computed for each output in the set of outputs. The method selects the output by identifying the first-set codeword that has the affinity score set with the best proximity score.

The method in some embodiments is performed during the training of a machine-trained network that includes the multiple layers of machine-trained processing nodes, along with a affinity-score generator and an affinity-score comparator. As the affinity scores for a codeword can be viewed as that codeword's signature, the affinity-score generator is referred to as a signature generator, while the affinity-score comparator is referred to as the signature comparator.

After the machine-trained processing nodes produce a codeword for an input, the signature generator generates the affinity score set for the produced codeword to identify the proximity of this codeword to each of the second set codewords. The signature comparator then compares this affinity score set with the signatures (i.e., the affinity score sets) previously defined for the different possible outputs.

When the method is performed during the training of the machine-trained network, the method performs a back-propagation operation in order to adjust the configurable parameters of the machine-trained network. In some embodiments, the configurable parameters of this network include the locations of the second set of codewords and/or configurable parameters (e.g., weight values) of the machined trained processing nodes. After training the machine-trained network, this network is used in some embodiments under runtime conditions to generate outputs for different inputs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a machine-trained method that produces an output from a set of outputs by processing an input. The method uses several layers of machine-trained processing nodes to process the input to produce a multi-dimensional codeword. For the produced codeword, the method generates a set of codeword affinity scores with each affinity score in the set identifying the proximity of the produced codeword to a different codeword in a set of previously defined codewords in a multi-dimensional codeword space.

In some embodiments, this space includes a first set of codewords that has at least one codeword for each output in the set of outputs, and a second set of codewords that includes several codewords that are defined to differentiate the first set of codewords from each other. The second set of codewords in some embodiments includes some but not all of the first set of codewords. In other embodiments, the second set of codewords do not include any of the first set of codewords. In some embodiments, the codeword affinity scores that the method generates identify the proximity of the produced codeword to a different codeword in the second set of codewords.

The method compares the set of affinity scores generated for the produced codeword with sets of affinity scores previously generated for the first set codewords that express the proximity of the first-set codewords to the second-set codewords. Based on this comparison, the method identifies the first-set codeword that has the affinity score set that best matches the affinity score set generated for the produced codeword. The method selects the associated output of the identified first-set codeword as the output of the network for the input. The outputs in some embodiments are categories with which the machine-trained method has to associate each of several inputs.

As mentioned above, the second set of codewords in some embodiments includes codewords that are defined in the multi-dimensional codeword space in order to differentiate the different codewords in the first set of codewords for the different outputs of the network. Also, in some embodiments, the second set of codewords has a different number of codewords than the first set of codewords. For instance, the second set of codewords in some embodiments has more codewords than the first set of codewords. In some embodiments, the second set of codewords are defined in the multi-dimensional codeword space in order to define the boundaries between the first set of codewords that are generated for the outputs.

Figure 1:
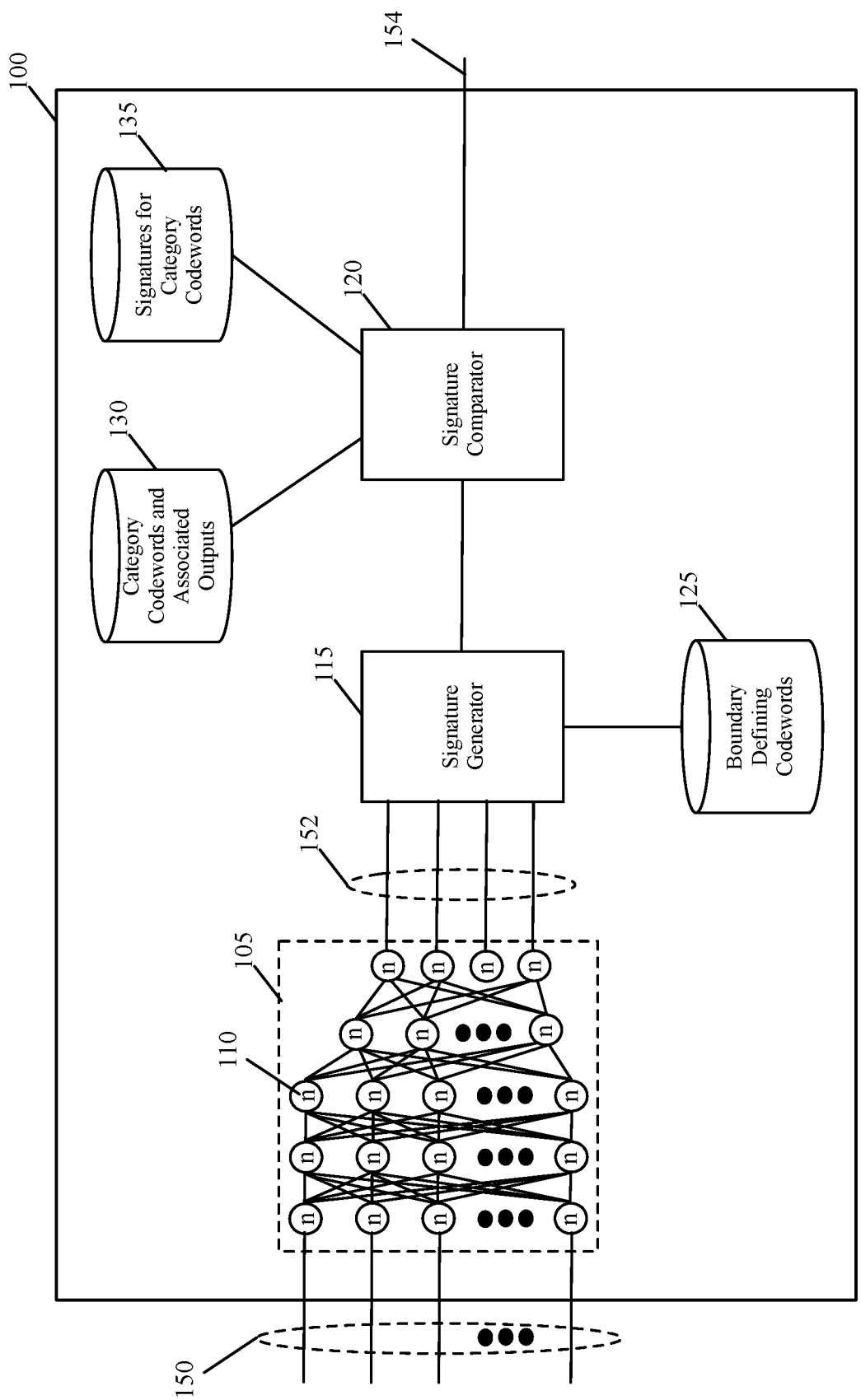
FIG. 1 illustrates a machine-trained processing apparatus that uses the above-described method to produce an output from a set of outputs for a particular input.

FIG. 1 illustrates a machine-trained processing apparatus 100 that uses the above-described method to produce an output from a set of outputs for a particular input. As shown, this apparatus includes a machine-trained network 105, a signature generator 115, and a signature comparator 120. The machine-trained network 105 processes a multi-dimensional input 150 to produce a multi-dimensional output codeword 152. In some embodiments, the input is an N dimensional value, while the output codeword is an M dimensional value. In the example illustrated in FIG. 1, M is 4, while N is a value greater than 4. In other embodiments, these values are different. Also, in different embodiments, each value along each dimension is defined in terms of a different number of bits, e.g., 8-bits, 16-bits, 32-bits, etc.

As shown, the machine-trained network 105 includes several layers of machine-trained processing nodes 110. In some embodiments, the network 105 is a feed forward network with one layer of input processing nodes, several layers of interior processing nodes, and one layer of output processing nodes. In the network 105, each interior processing node receives two or more outputs of processing nodes from earlier processing node layers and provides its output to one or more processing nodes in subsequent layers.

Figure 2:
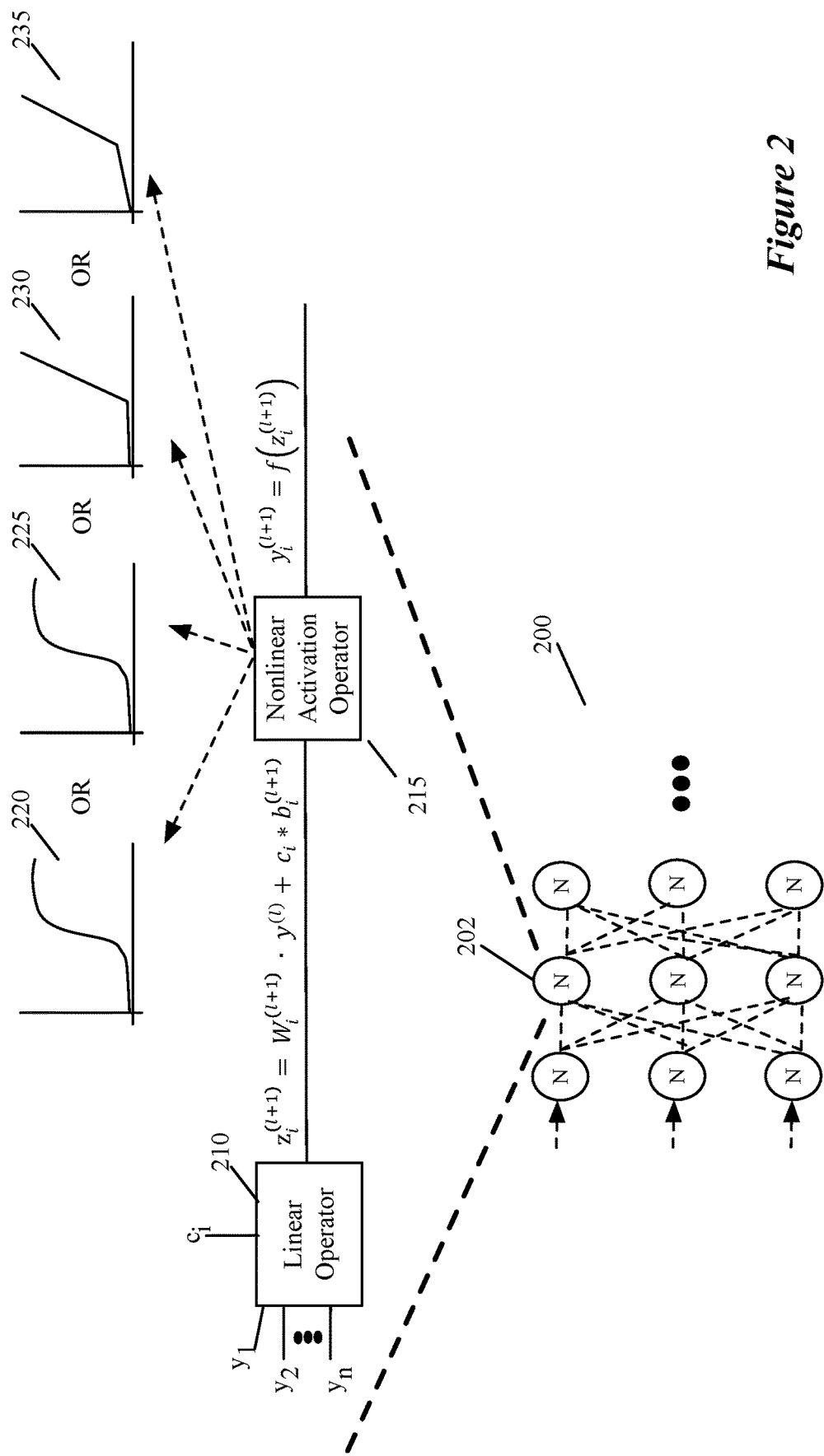
FIG. 2 illustrates an example of a processing node of the network of some embodiments.

FIG. 2 illustrates an example of a processing node 110 of the network 105 of some embodiments. In this example, each processing node 110 is a neuron 202, and the feed-forward network is a feed-forward neural network 200. In other embodiments, the neural network is not a feed forward network (e.g., is a recurrent network, etc.). In all but the last layer of the feed-forward neural network 200, each interior neuron 202 receives two or more outputs of neurons from earlier processing node layers and provides its output to one or more neurons in subsequent layers. The outputs of the neurons in the last layer represent the output of the network 200. In some embodiments, each output dimension of the network 200 is rounded to a quantized value.

As shown in FIG. 2, each neuron in neural network 200 has a linear component 210 and a nonlinear component 215. The linear component 210 of each interior or output neuron in this example computes a dot product of a vector of weight coefficients and a vector of output values of prior nodes, plus an offset. In other words, an interior or output node's linear operator computes a weighted sum of its inputs (which are outputs of the previous stage neurons that the linear operator receives) plus an offset. Similarly, the linear component 210 of each input neuron computes a dot product of a vector of weight coefficients and a vector of input values, plus an offset. Each neuron's nonlinear component 215 computes a function based on the output of the neuron's linear component 210. This function is commonly referred to as the activation function.

The notation of FIG. 2 can be described as follows. Consider a neural network with L hidden layers (i.e., L layers that are not the input layer or the output layer). The variable l can be any of the L hidden layers (i.e., l∈ {1, . . . , L} index the hidden layers of the network). The variable $z_i^{(l+1)}$ represents the output of the linear component of an interior neuron i in layer l+1. As indicated by the following Equation 1, the variable $z^{(l+1)}$ is computed as the dot product of a vector of weight values $W^{(l)}$ and a vector of outputs $y^{(l)}$ from layer l, normalized by a constant value $c_i$, and summed with a weight value $b_i$, typically referred to as a bias.

$$z_i^{(l+1)} = (W_i^{(l+1)} \cdot y^{(l)}) * c_i + b_i^{(l+1)}. \quad (1)$$

The constant value $c_i$ is a value to which all the weight values are normalized. In some embodiment, the constant value $c_i$ is 1. The symbol * is an element-wise product, while the symbol is the dot product. The weight coefficients $W^{(l)}$ are parameters that can be adjusted during the network's training in order to configure this network to solve a particular problem.

The output $y^{(l+1)}$ of the nonlinear component 215 of a neuron in layer l+1 is a function of the neuron's linear component, and can be expressed by Equation 2 below.

$$y_i^{(l+1)} = f(z_i^{(l+1)}), \quad (2)$$

In this equation, $f$ is the nonlinear activation function for node i. Examples of such activation functions include a sigmoid function 220 ($f(x)=1/(1+e^{-x})$), a tan h function 225, a ReLU (rectified linear unit) function 230 or a leaky ReLU function 235, as shown.

Traditionally, the sigmoid function and the tan h function have been the activation functions of choice. More recently, the ReLU function has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv: 1502.01852, 2015. In some embodiments, the activation functions can be other types of functions, like cup functions and periodic functions.

Equation 2 can be expressed in the following expanded format of Equation 3.

$$y_i^{(l+1)} = f(z_i^{(l+1)}) = f\left[\left(\sum_{k=1}^n w_{ki} \cdot y_k\right) * c_i + b_i^{(l+1)}\right]. \quad (3)$$

In this equation, $w_{ki}$ are weight values associated with the inputs $y_k$ of the neuron i in layer l+1.

Before the network 105 can be used to solve a particular problem, the network in some embodiments is put through a supervised training process that adjusts the network's configurable parameters (e.g., the weight coefficients of its linear components). The training process iteratively selects different input value sets with known output value sets. For each selected input value set, the training process traditionally forward propagates the input value set through the network's nodes to produce a computed output value set. The training process then back propagates an error value that expresses the error (e.g., the difference) between the outputs that the network 105 produces for the inputs of the training set and the known outputs of these inputs. This back propagation operation adjusts the network's configurable parameters. The training of the network 105 will be further described below.

In the example illustrates in FIG. 1, the network 105 produce a 4-dimensional output codeword 152 after processing any input. One of ordinary skill will realize that the machine-trained networks of other embodiments produce codewords with fewer or additional dimensions. The output codeword 152 is an encoded version of the output that the machine-trained apparatus produces. To decode this output, the apparatus 100 uses the signature generator 115 and the signature comparator 120.

The encoded output is an output in an M dimensional codeword space that includes (1) a first set of codewords that are generated for the different outputs (e.g., the different categories) in the set of outputs produced (e.g., in the set of categories predicted) by the network, and (2) a second set of codewords that are defined in order to differentiate the codewords in the first codeword set and/or to differentiate boundaries between the codewords in the first codeword set. The first and second sets of codewords are different sets of codewords (e.g., the second set of codewords has more codewords than the first set of codewords). These two sets of codewords are mutually exclusive in some embodiments. In other embodiments, these two sets may partially overlap but at least one of these sets has at least one codeword not in the other.

To decode the encoded output codeword 152, the signature generator 115 generates a signature that includes a set of affinity scores, with each affinity score in this set identifying a proximity of (e.g., a distance between) the codeword 152 to a different codeword in a second set of codewords. The second set codewords are stored in a codeword storage 125. The codewords in the second set of codewords are referred to below as the boundary defining codewords. As further described below, the signature generator in some embodiments computes each affinity score by projecting the codewords onto a hyper sphere, and then using an exponential decay formula to calculate the affinity score between two codewords.

The signature comparator 120 then compares the generated signature with signatures that are previously generated for the first set of codewords, which were previously generated for the outputs. The signatures for the first set of codewords are stored in a signature storage 135, while the first set of codewords and their associated outputs are stored in codeword storage 130. For some embodiments, the codewords in the first set of codewords are referred to below as the category codewords. In other embodiments, one storage stores the first set codewords, their associated outputs and their associated signatures.

Like the signature generated for the encoded output codeword 152, the signature (in storage 135) for each particular output's codeword (in storage 130) includes a set of affinity scores, with each affinity score in the particular output's set identifying a proximity of the particular output's codeword to a different codeword in a second set of codewords. As further described below, the signature comparator 120 compares two signatures by (1) treating each signature as a defining point in a T dimensional space, with T being the number of affinity scores in each signature, and (2) measuring the proximity (e.g., the distance) between these two points in the T dimensional space. Also, as further described below, the signature comparator in some embodiments computes the affinity score between each two signatures by using an exponential decay formula. From the storage 130, the comparator 120 selects the output that has the signature that is closest to the signature generated (by the generator 115) for the produced codeword 152. The comparator 120 outputs this selected output as the output 154 of the machine-trained apparatus 100.

Figure 3:
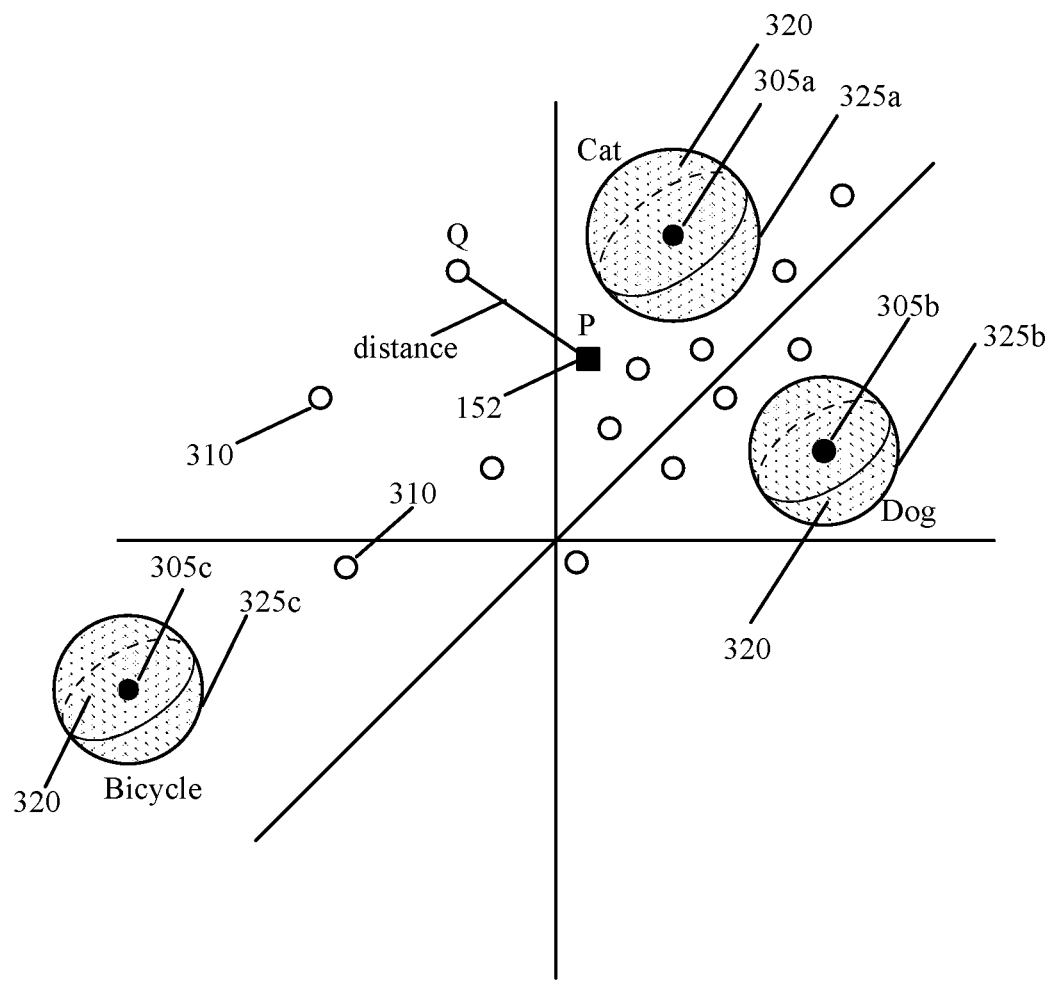
FIG. 3 presents a multi-dimensional codeword space.

To conceptually illustrate these codewords, FIG. 3 presents a multi-dimensional codeword space that includes a first set of codewords 305 associated with three possible outputs of the machine-trained apparatus 100, a second set of codewords 310 placed between the first codeword set 305, and a codeword 152 that the machine-trained network 105 generates for a particular input 150. To help visualize the multi-dimensional space, this space is only presented as a three-dimensional space, but one of ordinary skill will realize that this space has as many dimensions as the codewords produced by the network 105 have dimensions. Also, in this figure, the first set codewords are represented by black-filled circles 305, the second set codewords are represented by white-filled circles 310, and the generated codeword 152 is represented by a black-filled box.

In some embodiments, each output's codeword in the first set of codewords 305 is produced by averaging (e.g., by computing the centroid of) the codewords that the network 105 produces, during the training of the network 105, for each input/output pair that is associated with the output. The computation of an output's codeword by averaging the codewords computed for this output during training will be further described below.

FIG. 3 illustrates the codewords 320 that the network 105 produces during training for each output as a collection of smaller points about the first set of output codewords 305, which are illustrated as larger black-filled points. As shown, the smaller points about each output codeword 305 approximately fall within a bounding shape (e.g., a sphere or another bounding shape) about the output codeword, with the second set of codewords 310 falling mostly in between these bounding shapes to differentiate the first set of codewords and/or to define boundaries between the first set of codewords or between the bounding shapes about the first set of codewords. Also, as shown, this example has more second set codewords 310 than first set codewords 305.

In the example illustrated in FIG. 3, the machine-trained apparatus is a classifier that analyzes an image to determine whether the image contains a picture of one of several object categories, such as Cat, Dog, Bicycle, etc. Accordingly, the three bounding shapes 325 are shown to be associated with three of these categories, Cat, Dog, and Bicycle. The machine-trained classifier apparatus in some embodiments does not define these bounding shapes. Rather, these shapes simply represent in FIG. 3 the cluster of training points associated with each of the categories. As shown, the Cat and Dog clusters 325a and 325b are much closer to each other than the bike cluster 325c because cats and dogs look much more like each other than they do to bicycles. Also, as shown in FIG. 3, more second set codewords 310 are defined between the Cat and Dog clusters 325a and 325b (and between their respective first codewords 305a and 305b), and between either of these clusters and the Bicycle cluster (or its codeword 305c). This is because more second set codewords are needed to differentiate the Cat and Dog categories, which are closer to each other than the Cat/Bicycle or Dog/Bicycle clusters.

FIG. 3 also illustrates the distance between the generated codeword 152 and one second set codeword 310. To compute this distance d between two codewords P and Q (with P being codeword 152 and Q being the second-set codeword) each of which is an M-dimensional value, a scoring engine (not shown) of the signature generator 115 of some embodiments (1) discards one of the dimensions of each codeword to project the codeword onto a hyper sphere, and then (2) uses the Pythagorean theorem to compute this distance:

$$d(P, Q) = \sqrt{\sum_{i=1}^{m}(p_i - q_i)^2}, \quad (4)$$

where m equals M−1. The scoring engine of the signature generator 115 projects each codeword onto a hyper sphere by discarding one of its dimensions, in order to make sure that the distance between any two codewords is bounded by a finite upper limit.

Based on the distance between the generated codeword 152 and a second set codeword 310, the scoring engine of the generator 115 computes an unnormalized exponential decay affinity score that is proportional to a base value B raised to the negative of the distance value, as follows:

$$CA(P,Q_j) \propto B^{-d}, \quad (5)$$

where CA is the codeword affinity score between two codewords P and Q, with P being the generated codeword 152, and Q being one of the second set of codewords in the storage 125. In some embodiments, the second set of codewords include X codewords, the base value B is the Euler's constant e, and the affinity score is a normalized Boltzmann distribution value, as follows:

$$CA_j^N(P, Q_j) \propto \frac{e^{-d_j}}{\sum_{j=1}^{X} e^{-d_j}}, \quad (6)$$

where j is variable that specifies one of the X codewords in the second codeword set. In some embodiments, $$CA_j^N(P, Q_j) = \frac{e^{-d_j}}{\sum_{j=1}^{X} e^{-d_j}}, \quad (7)$$

while in other embodiments $$CA_j^N(P, Q_j) = C1 * \frac{e^{-d_j}}{\sum_{j=1}^{X} e^{-d_j}}, \quad (8)$$

where C1 is a constant.

The Equations 6, 7, and 8 normalize the affinity scores by dividing each unnormalized codeword affinity score by the sum all of the unnormalized affinity scores in the same set of affinity scores for the generated output codeword 152. As mentioned above, the set of affinity scores for the generated output codeword 152 includes one affinity score for each second set codeword the expresses the proximity of the generated codeword 152 and the second set codeword. Using the sum of all affinity scores to normalize each affinity score ensures that each affinity score is a value between 0 and 1 (or 0 and C1 for Equation 8) for each produced codeword. The exponential decay formulation ensures that the affinity score for second set codewords that are farther from the generated codeword 152 are dramatically smaller than the affinity scores for second set codewords that are closer to the generated codeword 152 in the M dimensional codeword space.

In some embodiments, the signature comparator 120 computes affinity scores to compare two signatures in a similar manner to how the signature generator 115 computes affinity scores to compare to codewords. Specifically, the comparator 120 compares two signatures by (1) treating each signature as a defining a point in a T dimensional space, with T being the number of affinity scores in each signature, and (2) measuring the proximity (e.g., the distance) between these two points in the T dimensional space.

To compute the distance D between two sets of affinity scores r and s, each of which has T-values, a scoring engine (not shown) of the signature comparator 120 of some embodiments uses the Pythagorean theorem to compute this distance:

$$D(R, S) = \sqrt{\sum_{i=1}^{T} (r_i - s_i)^2}. \qquad (9)$$

Based on the distance between the generated signature for the generated codeword 152 and a signature for one of the outputs, the scoring engine of the comparator 120 computes an unnormalized exponential decay affinity score that is proportional to a base value B raised to the negative of the distance value, as follows:

$$SA(R,S) \propto B^{-D}, \qquad (10)$$

where SA is the signature affinity score between the two signatures r and s, with r being the generated signature for the generated codeword 152, and s being the signature for one of the outputs in the set of outputs in the storage 135. In some embodiments, the set of output include K outputs for K categories, the base value B is the Euler's constant e, and the signature affinity score is a normalized Boltzmann value, as follows:

$$SA_j^N(R, S_j) \propto \frac{e^{-D_j}}{\sum_{j=1}^{K} e^{-D_j}}, \qquad (11)$$

where j is variable that specifies one of the K outputs in the set of outputs. In some embodiments, $$SA_j^N(R, S_j) = \frac{e^{-D_j}}{\sum_{j=1}^{K} e^{-D_j}}, \qquad (12)$$

while in other embodiments $$SA_j^N(R, S_j) = C2 * \frac{e^{-D_j}}{\sum_{j=1}^{K} e^{-D_j}}, \qquad (13)$$

where C2 is a constant.

The Equations 11-13 normalize the signature affinity scores by (1) dividing each unnormalized signature affinity score of the generated signature of the produced output codeword 152 with each output signature, with (2) the sum of all the unnormalized signature affinity scores of the generated signature of the produced output codeword 152 for all the outputs in the set of outputs. As mentioned above, the set of affinity scores for the generated signature of the output codeword 152 includes one affinity score for each output that expresses the proximity of the generated signature and the signatures of the output. Using the sum of all signature affinity scores to normalize each affinity score ensures that each signature affinity score is a value between 0 and 1 (or 0 and C2 for Equation 13) for each produced codeword. The exponential decay formulation ensures that the signature affinity scores for outputs that have substantially different signatures are dramatically smaller than the affinity scores for outputs that have more similar signatures to the generated signatures of the generated codeword 152 in the T dimensional signature space.

Figure 4:
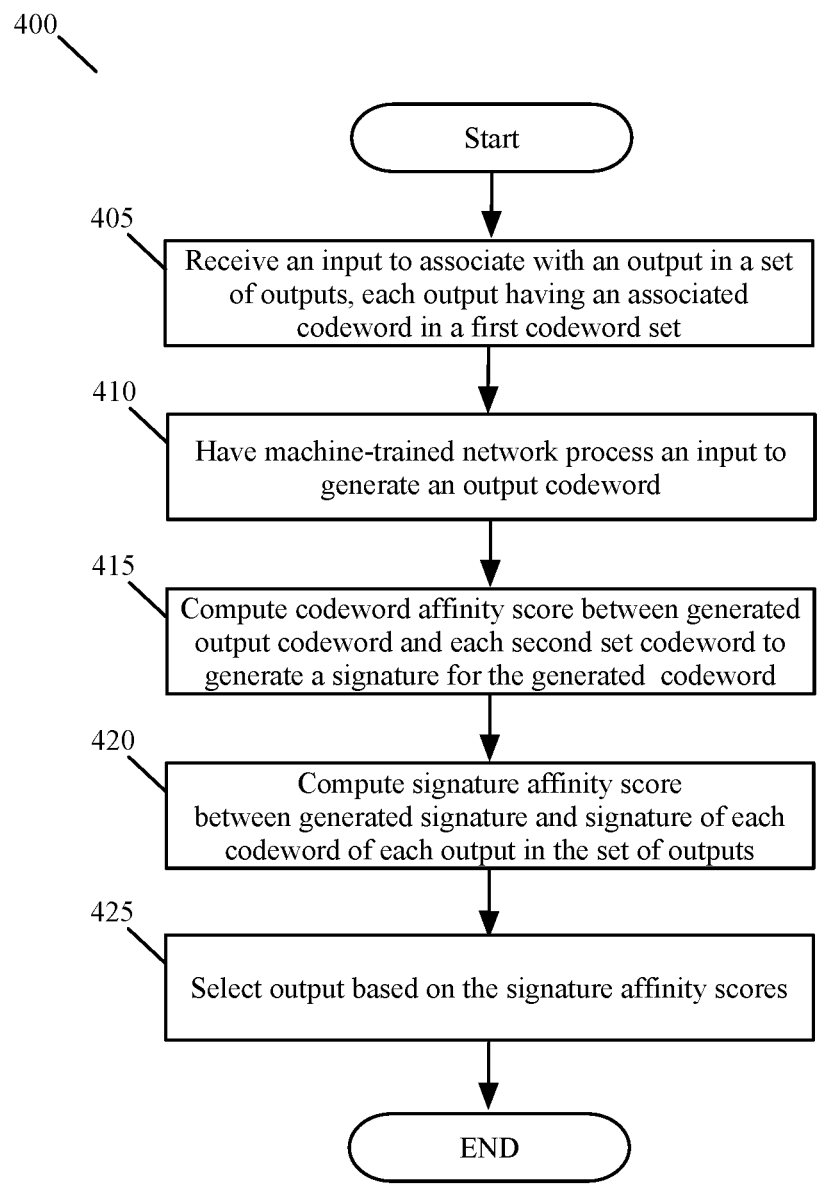
FIG. 4 illustrates a process that a machine-trained apparatus of some embodiments uses to produce an output from a set of outputs for a particular input.

FIG. 4 illustrates a process 400 that the machine-trained apparatus 100 of some embodiments uses to produce an output from a set of outputs for a particular input. As shown, the process initially starts when the machine-trained network 105 receives (at 405) an input that has to be associated with an output in a set of outputs for which the apparatus 100 maintains codewords and signatures. The outputs set of codewords are referred to below as the first set of codewords. In some embodiments, the process 400 is a classification process that analyzes an image to identify whether one of several categories of objects (e.g., cats, dogs, bicycles, etc.) are in the image. In these embodiments, each output is one of the categories (e.g., cats, dogs, bicycles, etc.), and the codewords in the first set are category codewords.

At 410, the machine-trained network 105 processes the received input to produce a multi-dimensional output codeword 152. In some embodiments, the input is an N dimensional value, while the output codeword is an M dimensional value. For the image-classification example, the input values are pixel values of the image or of a down-sampled version of the image. Also, in the example illustrated in FIG. 1, M is 4, while N is a value greater than 4. In other examples, these values could be different.

Next, at 415, the signature generator 115 generates a signature for the generated output codeword 152. This signature in some embodiments includes a set of affinity scores, with each affinity score in this set quantifying the proximity of (e.g., a distance between) the codeword 152 to a different codeword in a second set of codewords that are placed in the M-dimensional codeword space to differentiate the first set of codewords. In some embodiments, the signature generator computes each affinity score by discarding one of the M-dimensional values in each codeword to project the codewords onto a hyper sphere, and then using an exponential decay formula (such as Equation 7 above) to calculate the affinity score between two codewords.

At 420, the signature comparator 120 then compares the signature generated at 415 with signatures that are previously generated for the first set of codewords. In some embodiments, the signature comparator 120 compares two signatures by (1) treating each signature as a defining a point in a T dimensional space, with T being the number of codeword affinity scores in each signature, and (2) computing a signature affinity score that quantifies the proximity (e.g., the distance) between these two signature points in the T dimensional space. The signature comparator in some embodiments uses an exponential decay formula (e.g., Equation 12 above) to calculate the affinity score between two signatures. Accordingly, for the signature generated at 415, the comparator 120 in some embodiments generates (at 420) several signature affinity scores, with each signature affinity score quantifying the proximity between the generated signature and the signature associated with the codeword of each of the outputs (e.g., each category codeword).

At 425, the signature comparator 120 identifies the output of the apparatus 100 for the received input based on the signature affinity scores generated at 420, and then ends. In some embodiments, the signature comparator selects the output in the output storage 130 that has the signature that is the closest to the signature generated (by the generator 115) for the produced codeword 152. When the Equation 12 is used, the closest signature is the signature with the largest signature affinity score.

Signature affinity score generated by Equation 12 is a percentage value. In some embodiments, the comparator provides the output that it selects at 425 with this output's associated percentage value, in order to provide a level of confidence in the output. Also, in some of these embodiments, the comparator 120 provides other possible outputs (e.g., the next one or two feasible outputs) along with their associated percentages (i.e., their associated signature affinity scores).

In still other embodiments, the comparator associates each output value to a number range within 0 to 100 based on their signature affinity scores, generates a random number from 0 to 100, and selects the output based on the number range in which the randomly generated number falls. For example, assume that one generated codeword 152 for a particular input, produces a signatures that has a signature affinity score of 95% with respect to a first output category, 5% for a second output category, and 0% for all other output categories. The comparator would define two ranges of numbers, one from 0 to 95 and one from 95 to 100. It would then randomly generate a number. When the number is between 0 to 95, the comparator would select the first output, while selecting the second output when the number is between 95 to 100.

As mentioned above, the configurable parameters of the machine-trained apparatus 100 are trained in some embodiments in a supervised training process. This training process supplies the machine-trained apparatus 100 with inputs with known outputs, compares outputs produced by the apparatus for the different inputs with the known outputs of these inputs, computes an error, and back propagates this error to train the configurable parameters of the machine-trained apparatus 100. In some embodiments, the configurable parameters of this apparatus include the codeword locations (e.g., the locations of the second set of codewords) and/or configurable parameters (e.g., weight values) of the processing nodes of the machine-trained network 105.

Figure 5:
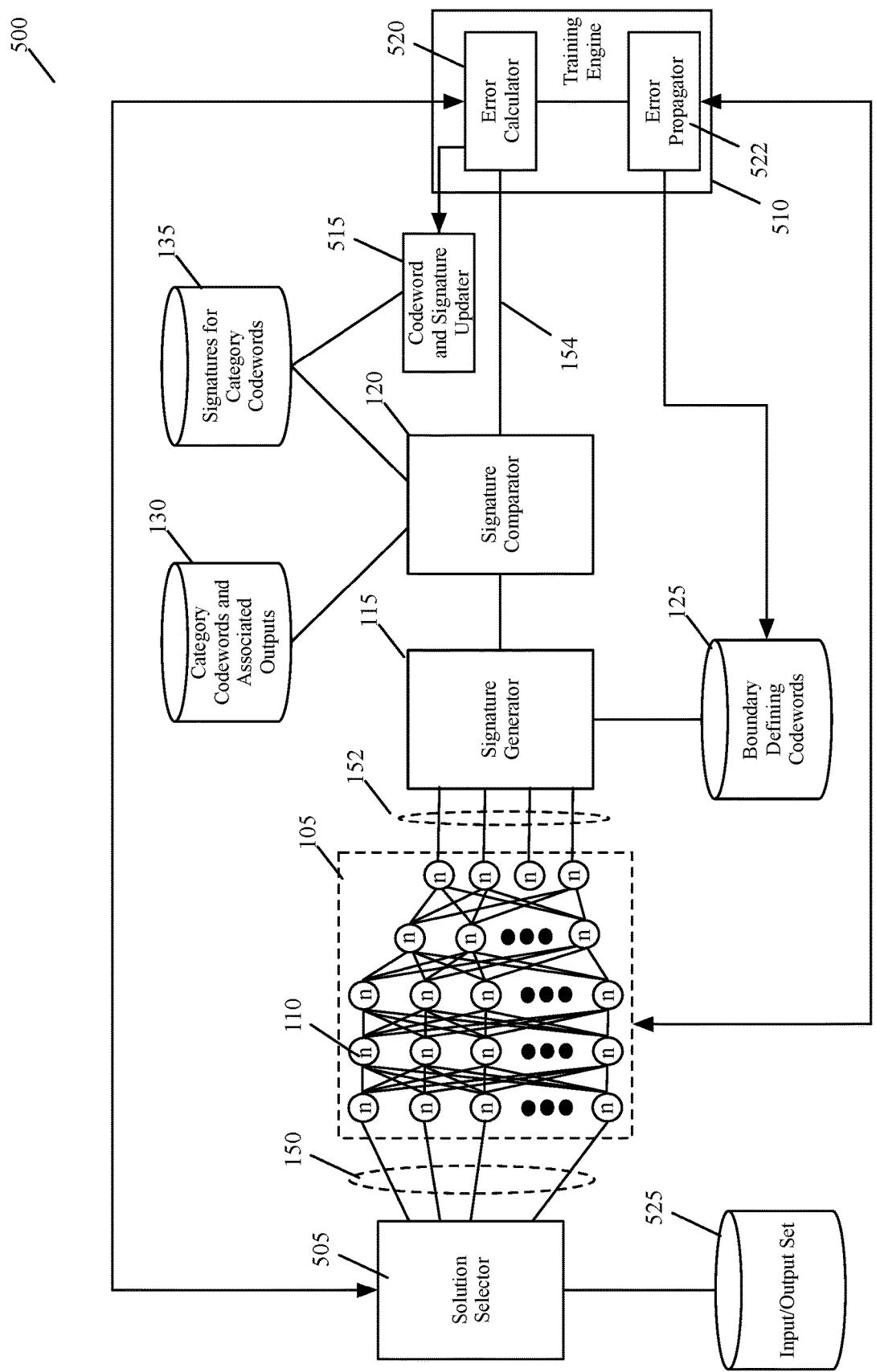
FIG. 5 illustrates a set of modules of some embodiments that perform a supervised training process that uses multiple known training set solutions to train the machine-trained network.
Figure 6:
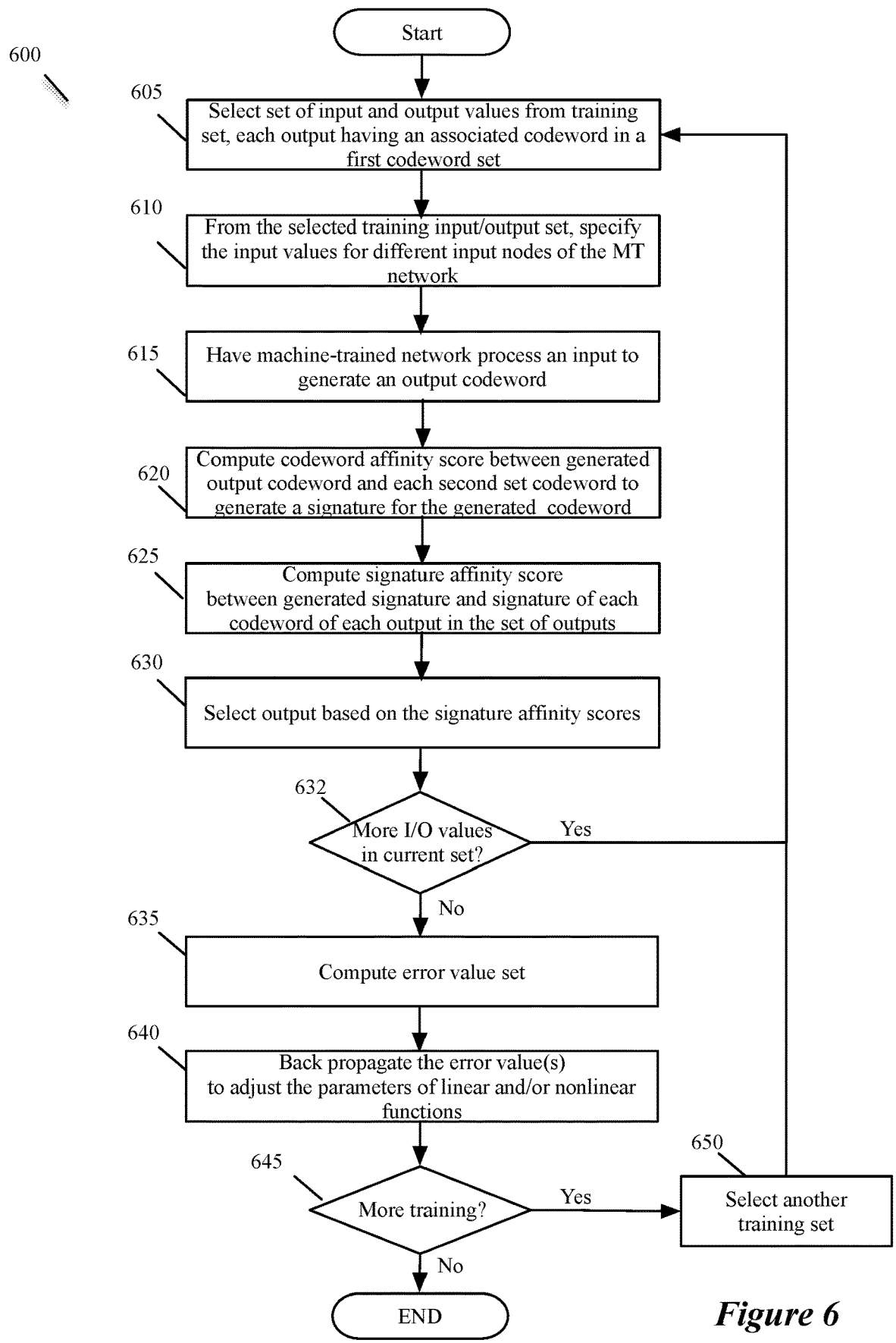
FIG. 6 illustrates a training process that the modules of FIG. 5 perform.

FIG. 5 illustrates a set of modules of some embodiments that perform a supervised training process that uses multiple known training set solutions to train the machine-trained network 100. As shown, these modules include a solution selector 505, a training engine 510, and a signature updater 515, in addition to other components (machine-trained network 105, the signature generator 115, and the signature comparator 120) described above by reference to FIG. 1. As shown, the training engine 510 includes an error calculator 520 and an error propagator 522. FIG. 6 illustrates a training process 600 that the modules of FIG. 5 perform.

As shown in FIG. 6, the solution selector 505 initially selects (at 605) a known solution set from one training set of solutions that are stored in a data storage 525. The selected solution set includes a set of input values and a set of output values. The output value set is the set of output values that the machine-trained apparatus 100 should generate for the input value set of the selected solution set. In other words, the output value set is the known/desired output value set for the input value set. For example, in some embodiments, the machine-trained apparatus is an image classifier that determines whether input images contain one of several categories of objects, such as cats, dogs, bicycles, etc. For these embodiments, each input/output set in the training set includes (1) a pixel value set of an image as the input value set, and (2) an object category (that specifies the type of object contained in the image) as the output value set. In some embodiments, the pixel value set for an image is a down-sampled set of pixels that are generated by down-sampling the pixels of the image.

At 610, the solution selector 505 provides the inputs to the machine-trained network's input nodes. For the above-described image-classification problem, the solution selector 505 in some embodiments supplies different sets of input pixel values as inputs to different input nodes of the machine-trained network 105. Next, the process 600 performs four operations 615-630 that are analogous to the four operations 410-425 of FIG. 4. Specifically, at 615, the machine-trained network 105 processes the received input to produce a multi-dimensional output codeword 152.

At 620, the signature generator 115 generates a signature for the generated output codeword 152. This signature in some embodiments includes a set of affinity scores, with each affinity score in this set quantifying the proximity of (e.g., a distance between) the codeword 152 to a different codeword in the second set of codewords that are placed in the M-dimensional codeword space to differentiate the first set of codewords. In some embodiments, the signature generator computes each affinity score by discarding one of the M-dimensional values in each codeword to project the codewords onto a hyper sphere, and then using an exponential decay formula (such as Equation 7 above) to calculate the affinity score between two codewords.

At 625, the signature comparator 120 then compares the signature generated at 620 with signatures that are previously generated for the first set of codewords. In some embodiments, the signature comparator 120 compares two signatures by (1) treating each signature as a defining a point in a T dimensional space, with T being the number of codeword affinity scores in each signature, and (2) computing a signature affinity score that quantifies the proximity (e.g., the distance) between these two signature points in the T dimensional space. The signature comparator in some embodiments computes the signature affinity score between each two signatures by using an exponential decay formula (e.g., Equation 12 above). Accordingly, for the signature generated at 620, the comparator 120 in some embodiments generates (at 625) several signature affinity scores, with each signature affinity score quantifying the proximity between the generated signature and the signature associated with the codeword of each of the outputs (e.g., each category codeword).

At 630, the signature comparator 120 selects the output for the received input based on the signature affinity scores generated at 625. In some embodiments, the signature comparator selects the output in the output storage 130 that has the signature that is the closest to the signature generated (by the generator 115) for the produced codeword 152.

When the Equation 12 is used, the closest signature is the signature with the largest signature affinity score.

Next, at 632, the process determines whether the current training set has more known solution sets. If so, the process returns to 605 to select another solution set from the storage 525 for the training set, and then repeats its operations for this selected solution. When the process determines (at 632) that it has used all the solution sets in the current training set, the process has (at 635) the error calculator 520 compute a set of error values from (1) the output value sets produced by the machine trained network for the supplied input value sets, and (2) the output value sets from the selected training input/output solution (selected at 605). In some embodiments, this error is computed by using a loss function. One example of this loss function is provided below.

As shown, the error calculator 520 receives the training set's output value(s) from the solution selector 505 in some embodiments. For the above-mentioned image classification example, the machine-trained network produces an output codeword that is a certain distance away from the codeword associated with the output selected (at 630) by the signature comparator. In some embodiments, the error calculator computes the error value based on the difference between these two codewords, or the distance between their associated signatures.

The error calculator 520 provides the computed error value that it computes to the error propagator 522, which then back propagates this error through to adjust the configurable parameters of the machine-trained apparatus 100. As mentioned above, the configurable parameters of this apparatus in some embodiments include the codeword locations (e.g., locations of the second set of codewords) and/or configurable parameters (e.g., weight values) of the processing nodes of the machine-trained network 105. As such, FIG. 5 shows the error propagator accessing the storage 125 to adjust the second set of codewords, and interacting with the processing nodes 110 of the network 105 to adjust the configurable parameters of these nodes.

In some embodiments, the error propagator distributes the computed error value between adjustments of the first set codewords and the configurable parameters of the network 100 by using the partial derivative of the loss function that the error calculator uses to compute the error value. In some embodiments, each processing node of the machined trained network 100 is an instantiated object that includes a back-propagation function for handling back-propagation calls from the error propagator 522. In these embodiments, each time the error propagator 522 calls a processing node's back-propagation function, this function computes adjustments to the node's configurable parameter(s) and returns to the error propagator 522 error values to propagate back to each of the inputs of the node's linear operator. To call the propagating function of a particular processing node that is not an output processing node, the error propagator 522 in some embodiments aggregates (e.g., sums) the error values that it has receives from all processing nodes when more than one processing node receives the particular processing node's output, and then supplies the aggregated error value to the particular processing node's propagating function.

After the computed error value is back propagated through the processing nodes of the machine-trained network 105 and one or more of these nodes adjust their configurable parameters during this back propagation, the error calculator 522 notifies the solution selector 505 that the error propagation has been completed. Next, at 645, the solution selector 505 determines whether it should stop the training of the MT network. In some embodiments, the solution selector 505 uses a minimization process (e.g., a stochastic gradient descent minimizer) to determine when it should stop the training of the apparatus 100.

When the solution selector 505 determines that it should continue the training, the process 600 selects (at 650) another training set, and then returns to 605 to select another training solution from the storage 525, and then repeats it operations for this selected solution. In some embodiments, the process 600 can iterate multiple times through one training solution (i.e., one input/output set), while this process is training the configurable parameters of the machine-trained apparatus 100. The process 600 ends when the solution selector 505 determines that it does not need to continue the training.

The error calculator 520 in some embodiments uses a loss function to compute an error value for a training set. The loss function of some embodiments will now be explained by reference to Equations 16-63. A machine-trained categorizer of some embodiments uses this loss function. For this loss function, these embodiments compute codeword and signature affinity scores like the scores described above by reference to Equations 6 and 11, except that they introduce two additional parameters (an alpha parameter and a lambda parameter) into these affinity scores, as shown by Equations 14 and 15 below.

$$CA_j^N(P, Q_j) \propto \frac{e^{-\alpha*\lambda_j*d_j}}{\sum_{j=1}^{X} e^{-\alpha*\lambda_j*d_j}}, \qquad (14)$$

$$SA_j^N(R, S_j) \propto \frac{e^{-A*\Lambda_j*d_j}}{\sum_{j=1}^{Y} e^{-A*\Lambda_j*d_j}}, \qquad (15)$$

In these equations, the alpha parameters (a and A) are global scaling parameters that are used by some embodiments to ensure that the generated scores fall within a range where the numbers are not too large or too small. The lambda parameters ($\lambda_i$ and $\Lambda_j$), on the other hand, define a radius for each boundary defining codeword (in case of $\lambda_i$) or each category codeword (in case of $\Lambda_j$). For boundary-defining codewords, the lambda parameter introduces another parameter to adjust to ensure that the boundary defining codewords do a good job segregating the codeword space. For the category codewords, the lambda parameter accounts for the natural scale of the categories (e.g., some categories might have more members that have more variance than other categories).

In some embodiments that use the Equations 16-63 below, each category signature $p_k$ is a vector with T components. This signature is obtained by first computing the codeword affinity scores for all training datums in category k and then finding the average codeword affinity score across the entire category. This is different than the above-described approach in that the above-described approach uses the category codewords (e.g., 130) as the centroids (e.g., 305a, 305b, 305c) of the cluster of ŷ points (e.g., 320) for each category, with bounding shape (e.g., 325a, 325b, 305c). The provisional computes the codeword affinity scores (e.g., 135) from these centroids. The category codewords (e.g., 130) are points in the M-dimensional codeword space and the corresponding signatures (e.g., 135) are points in the T-dimensional signature space.

The embodiments described below, however, compute the T-dimensional signatures of each training datum in category k (the $p_{ij}$ vectors described below) and then compute the centroid ($p_k$) and bounding shape ($\Lambda_k$) of those signatures. This results in the category codewords being bounded by shapes in the T-dimensional signature space instead of being bounded by shapes in the M-dimensional codeword space.

The Equations 16-63 below use different set of variables than Equations 1-15 above. The variables in Equations 16-63 have the following definitions.

- $x_i$ The network input data for training datum i (e.g., 150 in FIG. 5)
- $y_i$ The ground truth label for training datum i (the correct category)
- $\hat{y}_i$ The network output vector for training datum i with vector components $\hat{y}_{im}$ (e.g., 152 in FIG. 5)
- M The dimension of the 9 vector (M dimensional codeword space)
- K The number of possible categories
- K' The number of possible categories in an inner loop that steps through the k categories with another outer loop that step through the same k categories
- I' Identifies a network input data in an inner loop that steps through the i input values with another outer loop that step through the same i input values in a training set
- $Q_j$ Boundary-defining codeword j with vector components $Q_{jm}$ (in the M dimensional codeword space)
- J The total number of boundary-defining codewords
- J' The total number of boundary-defining codewords in an inner loop that steps through the boundary-defining codewords inside an outer loop that also steps through these codewords
- $\lambda_j$ The inverse squared radius of codeword $Q_j$. A learnable parameter.
- $\alpha$ Global scaling factor. A learnable parameter.
- $d_{ij}$ The distance from $\hat{y}_i$ to codeword $Q_j$
- $p_{ij}$ The probability that training datum i belongs to codeword $Q_j$ (the normalized codeword affinity score for training datum i)
- T The total number of boundary-defining codewords. The signature space is thus T-dimensional.
- $C_k$ The total number of training datums that belong to category k
- $p_k$ The signature for category k with vector components $p_{kj}$ (the centroid of category k)
- $\Lambda_k$ The inverse squared radius of category k
- A A second user-specified global scaling factor for the Hyper Boltzmann probabilities
- $d_{ik}$ The distance between $p_{ij}$ and $p_k$ (signature of training datum i to signature of category k)
- $p_{ik}$ The probability that training datum i belongs to category k (the normalized signature affinity score for training datum i)

In some embodiments, the codeword affinity score $p_{ij}$ (between the output of the machined-trained network 150 and a boundary-defining codeword $Q_j$) is expressed as:

$$p_{ij} = \frac{1}{s_i e^{\alpha \lambda_j d_{ij} + r_i}}, \tag{16}$$

where $$s_i = \Sigma_j e^{-\alpha \lambda_j d_{ij} - r_i}, \tag{17}$$

and $$d_{ij} = \|\hat{y}_i - Q_j\|^2 = \Sigma_m (\hat{y}_{im} - Q_{jm})^2, \tag{18}$$

and $$r_i = \max_j (-\alpha \lambda_j d_{ij}). \tag{19}$$

Also, in some embodiments, the category signature $p_k$ is the average $p_{ij}$ for all training datums i in category k, and is expressed as:

$$p_{kj} = \frac{1}{C_k} \Sigma_{i: y_i = k} d_{ik} p_{ij}. \tag{20}$$

As mentioned above, the category signature $p_k$ in some embodiments is a vector with T components that is obtained by first computing the codeword affinity scores for all training datums in category k and then finding the average codeword affinity score across the entire category. Thus, some embodiments compute the T-dimensional signatures of each training datum in category k (these are the $p_{ij}$ vectors) and then compute the centroid ($p_k$) and bounding shape ($\Lambda_k$) of those signatures. This results in the category codewords being bounded by shapes in the T-dimensional signature space instead of being bounded by shapes in the M-dimensional codeword space.

Some embodiments use the following squared Euclidean distance equation to express the distance between two signatures:

$$d_{ik} = \Sigma_j (p_{ij} - p_{kj})^2. \tag{21}$$

These embodiments then compute the average squared Euclidean radius for each category k. In some embodiments, this is the average squared Euclidean distance between all signatures $p_{ij}$ and $p_k$ for training datums i in category k. This number defines the size of the bounding shape of category k in the T-dimensional signature space.

$$\Lambda_k = \left(\frac{1}{C_k} \Sigma_{i: y_i = k} d_{ik}\right)^{-1} = \frac{C_k}{\Sigma_{i: y_i = k} d_{ik}}. \tag{22}$$

These embodiments then compute the signature affinity score p ik as follows:

$$p_{ik} = \frac{1}{S_i e^{A \Lambda_k d_{ik}} + R_i}, \tag{23}$$

where $$S_i = \Sigma_k e^{-A \Lambda_k d_{ik} - R_i}, \tag{24}$$

and $$R_i = \max_k (-A \Lambda_k d_{ik}). \tag{25}$$

In some embodiments, the component of p ik are interpreted as the probabilities that training datum i belongs to each of the output categories k and the components of $p_{ik}$ with the highest numerical value is the network's best estimate of the category for training datum i.

Ideally, the output vector $p_{ik}$ should have the numeric value 1.0 in the position of the correct category and 0.0 for all incorrect categories. Some embodiments train the machine-trained network 105 to produce the correct output by calculating a crossentropy loss function and back propagating the errors. These embodiments consider the ground truth label for training datum i to be formatted identically to the desired output vector. That is, $y_i$ should be a vector with components $y_{ik}$ with a 1.0 in the correct position and 0.0 everywhere else. The crossentropy loss function is thus defined in some embodiments to be:

$$L = \frac{1}{C}\sum_i \sum_k -\gamma_{ik}\ln p_{ik}k \qquad (26)$$

where C is the total number of training datums summed across all categories k (i.e., $\Sigma_k C_k$) and ln is the natural logarithm (log base e).

After the loss value is computed using the loss function, the back propagation process in some embodiments back propagates this loss value (i.e., this error value) through the machine-trained apparatus (e.g., 100 or 500) in order to adjust the learnable parameters of this apparatus. Like a typical training operation, the back propagation process propagates the loss value through the apparatus 100 or 500 by determining, for each learnable parameter, the rate of change of the loss function with respect to a change in the this learnable parameter at the current value of the loss function. The back propagation process uses the chain rule for partial derivatives to isolate the partial derivative of the loss function with respect to each individual learnable parameter used in the multi-layer network, and assigns a value to this partial derivative for the current value of the loss function. Thus, this process identifies the relative effect on the loss function of changes to the different learnable parameters used to generate the outputs of the apparatus.

The loss function partial derivatives for any learnable parameter $\rho$ (where $\rho \in \{\alpha, \lambda_j, Q_{im}, \hat{y}_{im}, A\}$) can be expressed as:

$$\frac{\partial L}{\partial \rho} = \frac{1}{C}\sum_i \sum_k -\frac{y_{ik}}{p_{ik}}\frac{\partial p_{ik}}{\partial \rho} \qquad (27)$$

To express $\partial p_{ik}/\partial \rho$, some embodiments define partial derivatives of $p_{ik}$ for any $\Xi$ (where $\Xi \in \{A, \Lambda_k, p_{kj}, p_{ij}\}$) and define partial derivatives of $p_{ij}$ for any $\xi$ (where $\xi \in \{\alpha, \Lambda_j, Q_{jm}, \hat{y}_{im}\}$). The partial derivatives of $p_{ik}$ for any $\Xi$ can be expressed as:

$$\frac{\partial p_{ik}}{\partial \Xi} = -P_{ik}\left(\frac{1}{S_i}\frac{\partial S_i}{\partial \Xi} + \Lambda_k d_{ik}\frac{\partial A}{\partial \Xi} + Ad_{ik}\frac{\partial \Lambda_k}{\partial \Xi} + A\Lambda_k\frac{\partial l_{ik}}{\partial \Xi}\right), \qquad (28)$$

where $$\frac{1}{S_i}\frac{\partial S_i}{\partial \Xi} = -\Sigma_k p_{ik}\left(\Lambda_k d_{ik}\frac{\partial A}{\partial \Xi} + Ad_{ik}\frac{\partial \Lambda_k}{\partial \Xi} + A\Lambda_k\frac{\partial d_{ik}}{\partial \Xi}\right), \qquad (29)$$

and $$\frac{\partial d_{ik}}{\partial \Xi} = 2(p_{ij} - p_{kj})\left(\frac{\partial p_{ij}}{\partial \Xi} - \frac{\partial p_{kj}}{\partial \Xi}\right), \qquad (30)$$

and $$\frac{\partial p_{kj}}{\partial p_{ij}} = \frac{\delta_{y_j k}}{C_k}. \qquad (31)$$

Plugging in A for $\Xi$:

$$\frac{\partial p_{ik}}{\partial A} = -p_{ik}\left(\frac{1}{S_i}\frac{\partial S_i}{\partial A} + \Lambda_k d_{ik}\frac{\partial A}{\partial A} + Ad_{ik}\frac{\partial \Lambda_k}{\partial A} + A\Lambda_k\frac{\partial d_{ik}}{\partial A}\right) = \qquad (32)$$
$$-p_{ik}\left(\frac{1}{S_i}\frac{\partial S_i}{\partial A} + \Lambda_k d_{ik}\right),$$

where $$\frac{1}{S_i}\frac{\partial S_i}{\partial A} = -\Sigma_k p_{ik}\left(\Lambda_k d_{ik}\frac{\partial A}{\partial A} + Ad_{ik}\frac{\partial \Lambda_k}{\partial A} + A\Lambda_k\frac{\partial d_{ik}}{\partial A}\right) = -\Sigma_k p_{ik}\Lambda_k d_{ik}. \qquad (33)$$

Plugging in $\Lambda_k$ for $\Xi$.

$$\frac{\partial p_{ik'}}{\partial \Lambda_k} = -p_{ik'}\left(\frac{1}{S_i}\frac{\partial S_i}{\partial \Lambda_k} + \Lambda_{k'} d_{ik'}\frac{\partial A}{\partial \Lambda_k} + Ad_{ik'}\frac{\partial \Lambda_{k'}}{\partial \Lambda_k} + A\Lambda_{k'}\frac{\partial d_{ik'}}{\partial \Lambda_k}\right) = \qquad (34)$$
$$-p_{ik'}\left(\frac{1}{S_i}\frac{\partial S_i}{\partial \Lambda_k} + Ad_{ik'}\delta_{kk'}\right),$$

where $$\frac{1}{S_i}\frac{\partial S_i}{\partial \Lambda_k} = -\Sigma_{k'} p_{ik'}\left(\Lambda_{k'} d_{ik'}\frac{\partial A}{\partial \Lambda_k} + Ad_{ik'}\frac{\partial \Lambda_{k'}}{\partial \Lambda_k} + A\Lambda_{k'}\frac{\partial d_{ik'}}{\partial \Lambda_k}\right) = \qquad (35)$$
$$-\Sigma_{k'} p_{ik'} Ad_{ik'}\delta_{kk'} = -p_{ik}Ad_{ik}.$$

Plugging in $p_{ij}$ for $\Xi$:

$$\frac{\partial p_{i'k}}{\partial p_{ij}} = -p_{i'k}\left(\frac{1}{S_{i'}}\frac{\partial S_{i'}}{\partial p_{ij}} + \Lambda_k d_{i'k}\frac{\partial A}{\partial p_{i'j}} + Ad_{i'k}\frac{\partial \Lambda_k}{\partial p_{ij}} + A\Lambda_k\frac{\partial d_{i'k}}{\partial p_{ij}}\right), \qquad (36)$$

where $$\frac{1}{S_{i'}}\frac{\partial S_{i'}}{\partial p_{ij}} = -\Sigma_k p_{i'k}\left(\Lambda_k d_{i'k}\frac{\partial A}{\partial p_{ij}} + Ad_{i'k}\frac{\partial \Lambda_k}{\partial p_{ij}} + A\Lambda_k\frac{\partial d_{i'k}}{\partial p_{i'j}}\right), \qquad (37)$$

and $$\frac{\partial \Lambda_k}{\partial p_{ij}} = -\frac{(\Lambda_k)^2}{c_k}\Sigma_{i':y_{i'}=k}\frac{\partial d_{i'k}}{\partial p_{ij}}, \qquad (38)$$

and $$\frac{\partial d_{i'k}}{\partial p_{ij}} = 2(p_{i'j} - p_{kj})\left(\frac{\partial p_{i'j}}{\partial p_{ij}} - \frac{\partial p_{kj}}{\partial p_{ij}}\right) = 2(p_{i'j} - p_{kj})\left(\delta_{i'i} - \frac{\delta_{y_j k}}{C_k}\right) \qquad (39)$$

Plugging in $p_{kj}$ for $\Xi$:

$$\frac{\partial p_{ik'}}{\partial p_{kj}} = -p_{ik'}\left(\frac{1}{S_i}\frac{\partial S_i}{\partial p_{kj}} + \Lambda_{k'} d_{ik'}\frac{\partial A}{\partial p_{kj}} + Ad_{ik'}\frac{\partial \Lambda_{k'}}{\partial p_{kj}} + A\Lambda_{k'}\frac{\partial d_{ik'}}{\partial p_{kj}}\right), \qquad (40)$$

where $$\frac{1}{S_i}\frac{\partial S_i}{\partial p_{kj}} = -\Sigma_{k'} p_{ik'}\left(\Lambda_{k'} d_{ik'}\frac{\partial A}{\partial p_{kj}} + Ad_{ik'}\frac{\partial \Lambda_{k'}}{\partial p_{kj}} + A\Lambda_{k'}\frac{\partial d_{ik'}}{\partial p_{kj}}\right), \quad (41)$$

and $$\frac{\partial \Lambda_{k'}}{\partial p_{kj}} = -\frac{(\Lambda_{k'})^2}{C_{k'}}\Sigma_{i:y_i=k'}\frac{\partial d_{ik'}}{\partial p_{kj}}, \quad (42)$$

and $$\frac{\partial d_{ik'}}{\partial p_{kj}} = 2(p_{ij} - p_{k'j})\left(\frac{\partial p_{ij}}{\partial p_{kj}} - \frac{\partial p_{k'j}}{\partial p_{kj}}\right) = -2(p_{ij} - p_{k'j})\delta_{kk'}. \quad (43)$$

In some embodiments, the partial derivatives of $p_{ij}$ for $\xi$ any (where $\xi \in \{\alpha, \lambda_j, Q_{jm}, \hat{y}_{im}\}$) can be expressed as:

$$\frac{\partial p_{ij}}{\partial \xi} = -p_{ij}\left(\frac{1}{s_i}\frac{\partial s_i}{\partial \xi} + \lambda_j d_{ij}\frac{\partial \alpha}{\partial \xi} + \alpha d_{ij}\frac{\partial \lambda_j}{\partial \xi} + \alpha\lambda_j\frac{\partial d_{ij}}{\partial \xi}\right), \quad (44)$$

where $$\frac{1}{s_i}\frac{\partial s_i}{\partial \xi} = -\sum_j p_{ij}\left(\lambda_j d_{ij}\frac{\partial \alpha}{\partial \xi} + \alpha d_{ij}\frac{\partial \lambda_j}{\partial \xi} + \alpha\lambda_j\frac{\partial d_{ij}}{\partial \xi}\right), \quad (45)$$

and $$\frac{\partial d_{ij}}{\partial \xi} = \begin{cases} 2(\hat{y}_{im} - Q_{jm}): & \xi = \hat{y}_{im} \\ -2(\hat{y}_{im} - Q_{jm}): & \xi = Q_{jm} \end{cases}. \quad (46)$$

Plugging $\alpha$ for $\xi$:

$$\frac{\partial p_{ij}}{\partial \alpha} = \quad (47)$$
$$-p_{ij}\left(\frac{1}{s_i}\frac{\partial s_i}{\partial \alpha} + \lambda_j d_{ij}\frac{\partial \alpha}{\partial \alpha} + \alpha d_{ij}\frac{\partial \lambda_j}{\partial \alpha} + \alpha\lambda_j\frac{\partial d_{ij}}{\partial \alpha}\right) = -p_{ij}\left(\frac{1}{s_i}\frac{\partial s_i}{\partial \alpha} + \lambda_j d_{ij}\right),$$

where $$\frac{1}{s_i}\frac{\partial s_i}{\partial \alpha} = -\sum_j p_{ij}\left(\lambda_j d_{ij}\frac{\partial \alpha}{\partial \alpha} + \alpha d_{ij}\frac{\partial \lambda_j}{\partial \alpha} + \alpha\lambda_j\frac{\partial d_{ij}}{\partial \alpha}\right) = -\sum_j p_{ij}\lambda_j d_{ij} \quad (48)$$

Plugging $\lambda_j$ for $\xi$:

$$\frac{\partial p_{ij'}}{\partial \lambda_j} = -p_{ij'}\left(\frac{1}{s_i}\frac{\partial s_i}{\partial \lambda_j} + \lambda_{j'} d_{ij'}\frac{\partial \alpha}{\partial \lambda_j} + \alpha d_{ij'}\frac{\partial \lambda_{j'}}{\partial \lambda_j} + \alpha\lambda_{j'}\frac{\partial l_{ij'}}{\partial \lambda_j}\right) = \quad (49)$$
$$-p_{ij'}\left(\frac{1}{s_i}\frac{\partial s_i}{\partial \lambda_j} + \alpha d_{ij'}\delta_{jj'}\right),$$

where $$\frac{1}{s_i}\frac{\partial s_i}{\partial \lambda_j} = -\sum_{j'} p_{ij'}\left(\lambda_{j'} d_{ij'}\frac{\partial \alpha}{\partial \lambda_j} + \alpha d_{ij'}\frac{\partial \lambda_{j'}}{\partial \lambda_j} + \alpha\lambda_{j'}\frac{\partial d_{ij'}}{\partial \lambda_j}\right) = \quad (50)$$
$$-\sum_{j'} p_{ij'}\alpha d_{ij'}\delta_{jj'} = -p_{ij}\alpha d_{ij}.$$

Plugging $\hat{y}_{im}$ for $\xi$:

$$\frac{\partial p_{ij}}{\partial \hat{y}_{im}} = -p_{ij}\left(\frac{1}{s_i}\frac{\partial s_i}{\partial \hat{y}_{im}} + \lambda_j d_{ij}\frac{\partial \alpha}{\partial \hat{y}_{im}} + \alpha d_{ij}\frac{\partial \lambda_j}{\partial \hat{y}_{im}} + \alpha\lambda_j\frac{\partial d_{ij}}{\partial \hat{y}_{im}}\right) = \quad (51)$$
$$-p_{ij}\left(\frac{1}{s_i}\frac{\partial s_i}{\partial \hat{y}_{im}} + \alpha\lambda_j\frac{\partial d_{ij}}{\partial \hat{y}_{im}}\right),$$

where $$\frac{1}{s_i}\frac{\partial s_i}{\partial \hat{y}_{im}} = \quad (52)$$
$$-\sum_j p_{ij}\left(\lambda_j d_{ij}\frac{\partial \alpha}{\partial y_{im}} + \alpha d_{ij}\frac{\partial \lambda_j}{\partial \hat{y}_{im}} + \alpha\lambda_j\frac{\partial d_{ij}}{\partial \hat{y}_{im}}\right) = -\sum_j p_{ij}\alpha\lambda_j\frac{\partial d_{ij}}{\partial \hat{y}_{im}}$$

and $$\frac{\partial d_{ij}}{\partial \hat{y}_{im}} = 2(\hat{y}_{im} - Q_{jm}). \quad (53)$$

Plugging $Q_{jm}$ for $\xi$:

$$\frac{\partial p_{ij'}}{\partial Q_{jm}} = -p_{ij'}\left(\frac{1}{s_i}\frac{\partial s_i}{\partial Q_{jm}} + \lambda_{j'} d_{ij'}\frac{\partial \alpha}{\partial Q_{jm}} + \alpha d_{ij'}\frac{\partial \lambda_{j'}}{\partial Q_{jm}} + \alpha\lambda_{j'}\frac{\partial d_{ij'}}{\partial Q_{jm}}\right) = \quad (54)$$
$$-p_{ij'}\left(\frac{1}{s_i}\frac{\partial s_i}{\partial Q_{jm}} + \alpha\lambda_{j'}\frac{\partial d_{ij'}}{\partial Q_{jm}}\right),$$

where $$\frac{1}{s_i}\frac{\partial s_i}{\partial Q_{jm}} = -\sum_{j'} p_{ij'}\left(\lambda_{j'} d_{ij'}\frac{\partial \alpha}{\partial Q_{jm}} + \alpha d_{ij'}\frac{\partial \lambda_{j'}}{\partial Q_{jm}} + \alpha\lambda_{j'}\frac{\partial d_{ij'}}{\partial Q_{jm}}\right) = \quad (55)$$
$$-\sum_{j'} p_{ij'}\alpha\lambda_{j'}\frac{\partial d_{ij'}}{\partial Q_{jm}},$$

and $$\frac{\partial d_{ij'}}{\partial Q_{jm}} = -2(\hat{y}_{im} - Q_{jm})\delta_{jj'}. \quad (56)$$

As mentioned above, some embodiments apply the chain rule to compute the derivative of loss with respect to the learnable parameters A, $\alpha$, $Q_{jm}$, $\lambda_j$, and network outputs $\hat{y}_{im}$. For $\partial L/\partial A$, some embodiments substitute in the formula for $\partial p_{ik}/\partial A$ given in Equation 17, and then also substitute in the formula for $1/S_i \; \partial S_i/\partial A$. given in Equation 18. This illustrates the caution that is used in some embodiments when applying the chain rule. Since the formula for as, $1/S_i \; \partial S_i/\partial A$ involves a summation over k, but the variable k is already in use in Equation 43, a new variable k' to distinguish the two contexts. Similarly, in some embodiments below, the variable i' is introduced to distinguish i.

$$\frac{\partial L}{\partial A} = \frac{1}{C} \sum_i \sum_k -\frac{y_{ik}}{p_{ik}} \frac{\partial p_{ik}}{\partial A} \quad (57)$$

$$= \frac{1}{C} \sum_i \sum_k \left[ -\frac{y_{ik}}{p_{ik}} \cdot -p_{ik} \left( \frac{1}{S_i} \frac{\partial S_i}{\partial A} + \Lambda_k d_{ik} \right) \right]$$

$$= \frac{1}{C} \sum_i \sum_k \left[ y_{ik} \cdot \left( \frac{1}{S_i} \left( -\sum_{k'} p_{ik'} \Lambda_{k'} d_{ik'} \right) + \Lambda_k d_{ik} \right) \right]$$

The remaining chain rule formulations are provided below. These formulations are shown without the expansions provided above for Equation 57. To get the final expressions for Equations 59-62 below, one or more expressions contained in Equations 16-56 have to be plugged into the Equations 59-62. Also, some of these formulations rely on $dp_{i,k}/dp_{ij}$, which can be expressed as follows:

$$\frac{\partial L}{\partial p_{ij}} = \frac{1}{C} \sum_{i'} \sum_k -\frac{y_{ik}}{p_{ik}} \frac{dp_{i'k}}{dp_{ij}} \quad (58)$$

$$\frac{\partial L}{\partial \alpha} = \sum_i \sum_j \frac{\partial L}{\partial p_{ij}} \frac{\partial p_{ij}}{\partial \alpha} \quad (59)$$

$$\frac{\partial L}{\partial Q_{jm}} = \sum_i \sum_{j'} \frac{\partial L}{\partial p_{ij'}} \frac{\partial p_{ij'}}{\partial Q_{jm}} \quad (60)$$

$$\frac{\partial L}{\partial \lambda_j} = \sum_i \sum_{j'} \frac{\partial L}{\partial p_{ij'}} \frac{\partial p_{ij'}}{\partial \lambda_j} \quad (61)$$

$$\frac{\partial L}{\partial \hat{y}_{im}} = \sum_i \sum_j \frac{\partial L}{\partial p_{ij}} \frac{\partial p_{ij}}{\partial \hat{y}_{im}} \quad (62)$$

$$\frac{dp_{i'k}}{dp_{ij}} = \frac{\partial p_{i'k}}{\partial p_{ij}} + \sum_{k'} \frac{\partial p_{i'k}}{\partial \Lambda_{k'}} \frac{\partial \Lambda_{k'}}{\partial p_{ij}} + \sum_{k'} \frac{\partial p_{i'k}}{\partial p_{k'j}} \frac{\partial p_{k'j}}{\partial p_{ij}} \quad (63)$$

Some embodiments do not use the boundary-defining codewords that have been described above. For instance, some embodiments have the machine-trained network 105 generated a codeword 152 for each input value set 150. For each input value set, these embodiments then compute Boltzmann density distributions to express the relationship between the generated codeword and each category's associated codeword (e.g., codewords 305a-c), and identify the output for the input value set (i.e., identify the category associated with the input value set) based on the Boltzmann density distribution. The Boltzmann density distribution for two codewords P and Q K (with codeword P being the codeword generated for the input value set, while codeword Q K is the codeword of category k) is expressed as ($e^{-d1}$, $e^{-d2}$, . . . , $e^{-dK}$).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
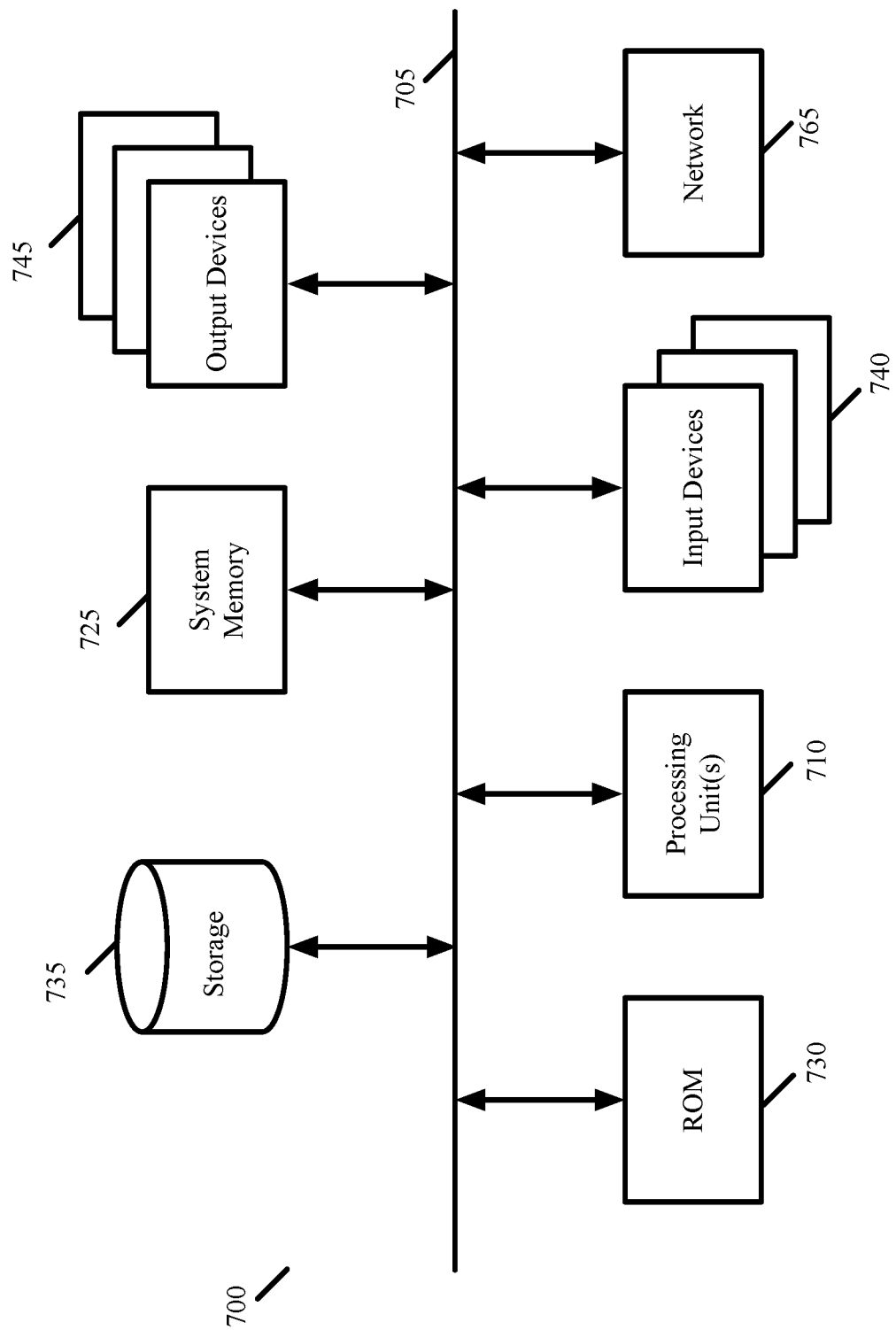
FIG. 7 conceptually illustrates a computer system with which some embodiments of the invention are implemented.

FIG. 7 conceptually illustrates a computer system 700 with which some embodiments of the invention are implemented. As such, it can be used to execute any of the above-described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, although some embodiments compute scores that are better scores when they are smaller (e.g., compute affinity scores that express distance values that are better when they are smaller values), one of ordinary skill will realize that in other embodiments the better scores are the larger scores. Thus, one of ordinary skill in the art would understand that the invention is not to be limited by the foregoing illustrative details, but rather is to be defined by the appended claims.

The invention claimed is:

1. A machine-trained method for analyzing an input image to determine whether the input image contains a picture of an object belonging to one object category from a plurality of object categories, the method comprising:
propagating an input image through a plurality of layers of a machine-trained (MT) network to produce a multi-dimensional codeword representing the input image in a multi-dimensional space that includes a first set of codewords comprising at least one codeword for each object category in the plurality of object categories, wherein each codeword in the first set of codewords represents one of the object categories, wherein propagating the input image through the plurality of layers comprises providing the input image to a first input layer of processing nodes that generate a first set of intermediate outputs that are subsequently provided to at least one subsequent layer of the MT network, each subsequent layer of the MT network comprising a respective set of processing nodes that receive intermediate outputs from at least one previous layer of the MT network and generate a respective set of intermediate outputs until an output layer of the MT network generates the multi-dimensional codeword representing the input image;
for the produced codeword representing the input image, generating a set of affinity scores with each affinity score identifying a proximity of the produced codeword to a different codeword in a second set of previously defined codewords representing other images, wherein each codeword in the second set of codewords is located at least a particular distance in the multi-dimensional space from any of the codewords in the first set of codewords in order to define boundaries between the codewords in the first set of codewords representing the object categories in the multi-dimensional space;
comparing the set of affinity scores generated for the produced codeword representing the input image with sets of affinity scores previously generated for the first-set codewords, wherein each set of affinity scores that is previously generated for each particular first-set codeword comprises a plurality of affinity scores each of which identifies a proximity of the particular first-set codeword representing an object category to a different codeword in the second set of codewords defining boundaries between the object categories; and
based on said comparison, identifying an object category to associate with the input image, said association specifying that the input image contains a picture of an object that belongs to the identified object category.

2. The machine-trained method of claim 1, wherein:
said comparing comprises, for each previously generated set of affinity scores in the previously generated sets of affinity scores, computing a proximity score that expresses a proximity between the previously generated set of affinity scores and the set of affinity scores generated for the produced codeword representing the input image; and
said identifying comprises identifying the object category represented by the first-set codeword that has the set of affinity scores that produces a best proximity score.

3. The machine-trained method of claim 2, wherein the proximity score is a distance value and the best proximity score is the smallest proximity score.

4. The machine-trained method of claim 2, wherein the best proximity score is the largest proximity score.

5. The machine-trained method of claim 1, wherein the second set of codewords has a different number of codewords than the first set of codewords.

6. The machine-trained method of claim 1, wherein the second set of codewords has more codewords than the first set of codewords.

7. The machine-trained method of claim 1, wherein the second set of codewords includes codewords that are defined in the multi-dimensional space in order to differentiate the codewords in the first set of codewords that are associated with the plurality of object categories.

8. The machine-trained method of claim 1, wherein each input image of a plurality of input images that are propagated through the plurality of layers of the network is associated with one of the object categories of the plurality of object categories.

9. The machine-trained method of claim 1 further comprising providing a confidence value for the identified object category, said confidence value expressing a level of confidence in the accuracy of the identified object category for the processed input image, said confidence value derived from a proximity score that expresses a proximity between the set of affinity scores for the first-set codeword representing the identified object category and the set of affinity scores generated for the produced codeword representing the input image.

10. A non-transitory machine readable medium storing a program for analyzing an input image to determine whether the input image contains a picture of an object belonging to one object category from a plurality of object categories, the program comprising sets of instructions for:
propagating an input image through a plurality of layers of a machine-trained (MT) network to produce a multi-dimensional codeword representing the input image in a multi-dimensional space that includes a first set of codewords comprising at least one codeword for each object category in the plurality of object categories, wherein each codeword in the first set of codewords represents one of the object categories, wherein propagating the input image through the plurality of layers comprises providing the input image to a first input layer of processing nodes that generate a first set of intermediate outputs that are subsequently provided to at least one subsequent layer of the MT network, each subsequent layer of the MT network comprising a respective set of processing nodes that receive intermediate outputs from at least one previous layer of the MT network and generate a respective set of intermediate outputs until an output layer of the MT network generates the multi-dimensional codeword representing the input image;
for the produced codeword representing the input image, generating a signature comprising a set of affinity scores with each affinity score identifying a proximity of the produced codeword to a different codeword in a second set of previously defined codewords representing other images, wherein each codeword in the second set of codewords is located at least a particular distance in the multi-dimensional space from any of the codewords in the first set of codewords in order to define boundaries between the codewords in the first set of codewords representing the object categories in the multi-dimensional space;
comparing the signature generated for the produced codeword representing the input image with previously defined signatures generated for the first set of codewords by computing, for each particular first-set codeword, a set of affinity scores that comprises a plurality of affinity scores each of which identifies a proximity of the particular first-set codeword representing an object category to a different codeword in the second set of codewords defining boundaries between the object categories; and
based on said comparison, identifying an object category to associate with the input image, said association specifying that the input image contains a picture of an object that belongs to the identified object category.

11. The non-transitory machine readable medium of claim 10, wherein:
the set of instructions for comparing comprises a set of instructions for computing, for each set of affinity scores in the previously defined signatures comprising the computed sets of affinity scores, a proximity score that expresses a proximity between the previously defined signature and the signature generated for the produced codeword representing the input image; and
the set of instructions for identifying comprises a set of instructions for identifying the object category represented by the first-set codeword that has the signature that produces a best proximity score.

12. The non-transitory machine readable medium of claim 11, wherein the proximity score is a distance value and the best proximity score is the smallest proximity score.

13. The non-transitory machine readable medium of claim 10, wherein each input image of a plurality of input images that are propagated through the plurality of layers of the network is associated with one of the object categories of the plurality of object categories.

14. The non-transitory machine readable medium of claim 10, wherein the program further comprises a set of instructions for providing a confidence value for the identified object category, said confidence value expressing a level of confidence in the accuracy of the identified object category for the processed input image, said confidence value derived from a proximity score that expresses a proximity between the signature for the first-set codeword representing the identified object category and the signature generated for the produced codeword representing the input image.

15. A machine-trained network for analyzing an input image to determine whether the input image contains a picture of an object belonging to one object category from a plurality of object categories, the network comprising:
a plurality of layers of machine-trained processing nodes through which the input image is propagated to produce a multi-dimensional codeword representing the input image in a multi-dimensional space that includes a first set of codewords comprising at least one codeword for each object category in the plurality of object categories, wherein each codeword in the first set of codewords represents one of the object categories, wherein the input image is propagated through the plurality of layers by a first input layer of processing nodes receiving the input image and generating a first set of intermediate outputs that are subsequently provided to at least one subsequent layer of processing nodes, each subsequent layer of processing nodes comprising a respective set of processing nodes that receive intermediate outputs from at least one previous layer of processing nodes and generate a respective set of intermediate outputs until an output layer of processing nodes generates the multi-dimensional codeword representing the input image;
a scoring engine to generate a set of affinity scores for the produced codeword representing the input image, each affinity score in the affinity score set identifying a proximity of the produced codeword to a different codeword in a second, different set of previously defined codewords representing other images, wherein each codeword in the second set of codewords is located at least a particular distance in the multi-dimensional space from any of the codewords in the first set of codewords in order to define boundaries between the codewords in the first set of codewords representing the object categories in the multi-dimensional space; and a comparator (i) to compare the set of affinity scores generated for the produced codeword representing the input image with sets of affinity scores previously generated for the first-set codewords, wherein each set of affinity scores that is previously generated for each particular first-set codeword comprises a plurality of affinity scores each of which identifies a proximity of the particular first-set codeword representing an object category to a different codeword in the second set of codewords defining boundaries between the object categories, and (ii) based on the comparison, to identify an object category to associate with the input image, said association specifying that the input image contains a picture of an object that belongs to the identified object category.

16. The machine-trained network of claim 15, wherein the scoring engine computes each affinity score in the generated set of affinity scores by using an exponential formula comprising (i) a base value and (ii) an exponent value comprising a negative of the distance between the produced codeword representing the input image and the codeword in the second set of codewords for which the affinity score is generated.

17. The machine-trained network of claim 16, wherein the base value is Euler mathematical number e.

18. The machine-trained network of claim 16, wherein:
for each particular codeword in the second set of codewords, the affinity score identifying the proximity of the produced codeword to the particular codeword is a normalized score that is proportional to an unnormalized score for the particular codeword divided by the sum of all unnormalized scores for all codewords in the second set of codewords; and the unnormalized score for each particular codeword in the second set of codewords is proportional to the base value raised to the negative of the distance between the produced codeword representing the input image and the particular codeword.

19. The machine-trained network of claim 15, wherein the scoring engine is a first scoring engine, wherein the comparator comprises:
a second scoring engine to compute, for each previously generated set of affinity scores in the previously generated sets of affinity scores, a proximity score that expresses a proximity between the previously generated set of affinity scores and the set of affinity scores generated for the produced codeword representing the input image; and a selection engine to identify the object category by (i) identifying the first-set codeword that has the previously generated set of affinity scores that produces a best proximity score and (ii) selecting the object category associated with the identified first-set codeword as the identified object category.

20. The machine-trained method of claim 1, wherein the second-set codewords are located in the multi-dimensional space at points between two first-set codewords representing two different object categories.

21. The machine-trained method of claim 1, wherein the sets of affinity scores for the first-set codewords are generated by, for each first-set codeword, identifying proximity of the first-set codeword to codewords in the second set of codewords.

* * * * *